United States Patent
Nag et al.

(10) Patent No.: US 12,067,598 B2
(45) Date of Patent: Aug. 20, 2024

(54) METHODS AND APPARATUS FOR PROVIDING CONTEXT AWARE PERSONALIZED IN-STORE CUSTOMER EXPERIENCE

(71) Applicant: Walmart Apollo, LLC, Bentonville, AR (US)

(72) Inventors: Kaushiki Nag, Sunnyvale, CA (US); Kannan Achan, Saratoga, CA (US); Shirpaa Manoharan, Sunnyvale, CA (US); Vidya Sagar Kalidindi, Milpitas, CA (US); Rahul Ramkumar, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/102,167

(22) Filed: Jan. 27, 2023

(65) Prior Publication Data
US 2023/0169548 A1 Jun. 1, 2023

Related U.S. Application Data

(63) Continuation of application No. 17/163,362, filed on Jan. 30, 2021, now abandoned.

(51) Int. Cl.
*G06Q 10/08* (2024.01)
*G06F 16/28* (2019.01)
(Continued)

(52) U.S. Cl.
CPC ....... *G06Q 30/0281* (2013.01); *G06F 16/285* (2019.01); *G06F 16/9535* (2019.01);
(Continued)

(58) Field of Classification Search
None
See application file for complete search history.

(56) References Cited

U.S. PATENT DOCUMENTS 10,304,069 B2   5/2019 Roeding et al.
10,885,560 B1*  1/2021 Ramachandran .. G06Q 30/0277
(Continued)

FOREIGN PATENT DOCUMENTS

JP          6630819 B2       1/2020

OTHER PUBLICATIONS

Bin et al., "Physical Proximity and Online User Behaviour in an Indoor Mobile Social Networking Application," IEEE Computer Society, (2011), pp. 373-382.
(Continued)

*Primary Examiner* — Romain Jeanty
(74) *Attorney, Agent, or Firm* — Morgan, Lewis & Bockius LLP; Manita Rawat

(57) ABSTRACT

The disclosed subject matter relates to a system and method for personalizing customer experience at a retailer's physical location in order to increase sales and customer satisfaction. The personalization is based upon classification of customer's online interaction with the retailer. Upon detecting the customer's presence at the retailer's physical location, data of the customer's online interactions is retrieved and classified based on the type of online interactions and temporal characteristics. Push content is transmitted to the customer, the push content being based upon at least the classification and data associated with retailer's physical location.

20 Claims, 5 Drawing Sheets

(51) Int. Cl.
    *G06F 16/9535*     (2019.01)
    *G06F 16/9537*     (2019.01)
    *G06Q 10/087*     (2023.01)
    *G06Q 30/02*     (2023.01)
    *G06Q 30/0204*     (2023.01)
    *G06Q 30/0601*     (2023.01)
    *H04L 67/52*     (2022.01)
    *H04L 67/55*     (2022.01)

(52) U.S. Cl.
    CPC ....... *G06F 16/9537* (2019.01); *G06Q 10/087* (2013.01); *G06Q 30/0205* (2013.01); *G06Q 30/0631* (2013.01); *H04L 67/52* (2022.05); *H04L 67/55* (2022.05); *G06Q 30/0625* (2013.01); *G06Q 30/0633* (2013.01)

(56) References Cited

U.S. PATENT DOCUMENTS

| | | |
|---|---|---|
| 2012/0123674 A1 | 5/2012 | Perks et al. |
| 2012/0303435 A1 | 11/2012 | Rawat et al. |
| 2013/0041837 A1 | 2/2013 | Dempski et al. |
| 2013/0204737 A1 | 8/2013 | Agarwal et al. |
| 2014/0278970 A1 | 9/2014 | Calman et al. |
| 2015/0066940 A1 | 3/2015 | Fernandes et al. |
| 2015/0112826 A1 | 4/2015 | Crutchfield, Jr. |
| 2017/0017352 A1 | 1/2017 | Kanter et al. |
| 2018/0174172 A1 | 6/2018 | Hughes et al. |
| 2018/0234796 A1* | 8/2018 | Saha .............. H04L 67/561 |
| 2019/0220916 A1 | 7/2019 | Levy et al. |

OTHER PUBLICATIONS

So Takana et al., "Push-content Delivery Method for Accurate Synchronization Between Broadcast Programs and Push Content," IEEE International Conference on Consumer Electronics (ICCE), (2016), pp. 237-238.

RetailPro "Beacons: Driving Sales With Customer Service Insight," www.retailpro.com, (2016), 9 pages.

* cited by examiner

METHODS AND APPARATUS FOR PROVIDING CONTEXT AWARE PERSONALIZED IN-STORE CUSTOMER EXPERIENCE

CROSS-REFERENCE TO RELATED APPLICATIONS

This application is a continuation of U.S. patent application Ser. No. 17/163,362, filed Jan. 30, 2021, and entitled "METHODS AND APPARATUS FOR PROVIDING CONTEXT AWARE PERSONALIZED IN-STORE CUSTOMER EXPERIENCE," which is incorporated by reference herein in its entirety.

TECHNICAL FIELD

The disclosed subject matter relates generally to personalizing an in-store experience based on the type of web based interactions of the customer.

BACKGROUND

Commercial websites and applications often provide recommendations to their users. These recommendations include content related to the current web page or application being accessed by the user (e.g., related news articles), products related to the product in the user's shopping cart (e.g., the user purchases shoes). If so, it may include recommendations or advertisements/advertisements related to the current web page being accessed by the user (e.g. sock recommendations) and/or the product in the user's shopping cart (e.g. shoes). Product and offer recommendations may also be submitted to email communications sent to the user. Personalized, relevant, and appropriate recommendations can help increase user traffic, sales, and/or revenue, and are therefore a key component of commercial websites and applications.

Operators of commercial websites however fail to recognize that the information gathered online may be advantageously tailored to personalize an in-store visit as well. Specifically, the information gathered from the user's interaction with the web page or app, may be used with data related to a specific store, or area of which the user is determined to be within proximity to. In other words, some of the same information which enables webpages to make recommendations to the user, may also be used to influence in-store behavior of the user, taking account of the temporal relationship between the gathered information and the users in-store visit. For example, the recommendation for purchase of socks described above would advantageously be tied to the inventory of the current store in which the user is located, or the same recommendation could be altered if the recommended pair of socks is not in stock at the particular store.

The temporal relationship of the prior information gathered from the user and the current in-store visit is another parameter that may be used to guide or personalize the user's in-store experience.

SUMMARY

The embodiments described herein are directed to a system and method for personalizing a customer's in-store experience. Personalizing the customer's in-store experience is advantageous in that it has been shown to be more influential that generic marketing and thus increased sales and allows among other things shaping customer traffic to aisles for targeted items and local/seasonal/geo-based customer centric targeting. In addition to or instead of the advantages presented herein, persons of ordinary skill in the art would recognize and appreciate other advantages as well.

In accordance with various embodiments, exemplary systems may be implemented in any suitable hardware or hardware and software, such as in any suitable computing device.

In some embodiments, the system includes a customer location beacon; a mobile device associated with the customer; a database; a communication system; and a computing device connected to the database, customer location beacon and the communication system. The computing device is configured to receive a notification of the customer's presence at the retailer's physical location from the customer location beacon, and triggered by the notification access the database(s) for the customer's prior or current online interactions with or available to the retailer. The computing device classifies the customer's online interactions into one of several of classifications, based in part on the temporal characteristic of those interactions. The computing device in these embodiments is also configured to access the database for retailer information associated with the visited store or retailer's physical location, and select push content based upon the classification and the retailer information associated with the visited store; and transmit the selected push content to the customer's phone or other mobile device.

In other embodiments, a method is provided that personalizes customer experience at a retailer's physical location based upon classification of customer's prior and current online interactions. The method including determining the customer's presence at the retailer's physical location, in response accessing the customer's online interactions with or available to the retailer and classifying the customer's recent online interactions into one of a plurality of classifications. The method also includes accessing retailer information associated with the specific physical location; selecting push content based upon the classification and the retailer information, and transmitting the push content to the customer's phone.

In yet other embodiments, a non-transitory computer readable medium having instructions stored thereon is provided. The instructions, when executed by at least one processor, cause a device to perform operations including determining the customer's presence at the retailer's physical location, accessing data of the customer's recent online interactions and retailer information associated with the retailer's physical location and classifying the customer's online interactions. The instructions also include selecting push content based upon the classification of the customer's interactions and the retailer information; and transmission of the selected push content to the customer's mobile device. The push content is also selected based on the object of the customer's online interaction given a first classification, selected based on features from the retailer information given a second classification and selected based on the object of an in-store search in a third classification.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
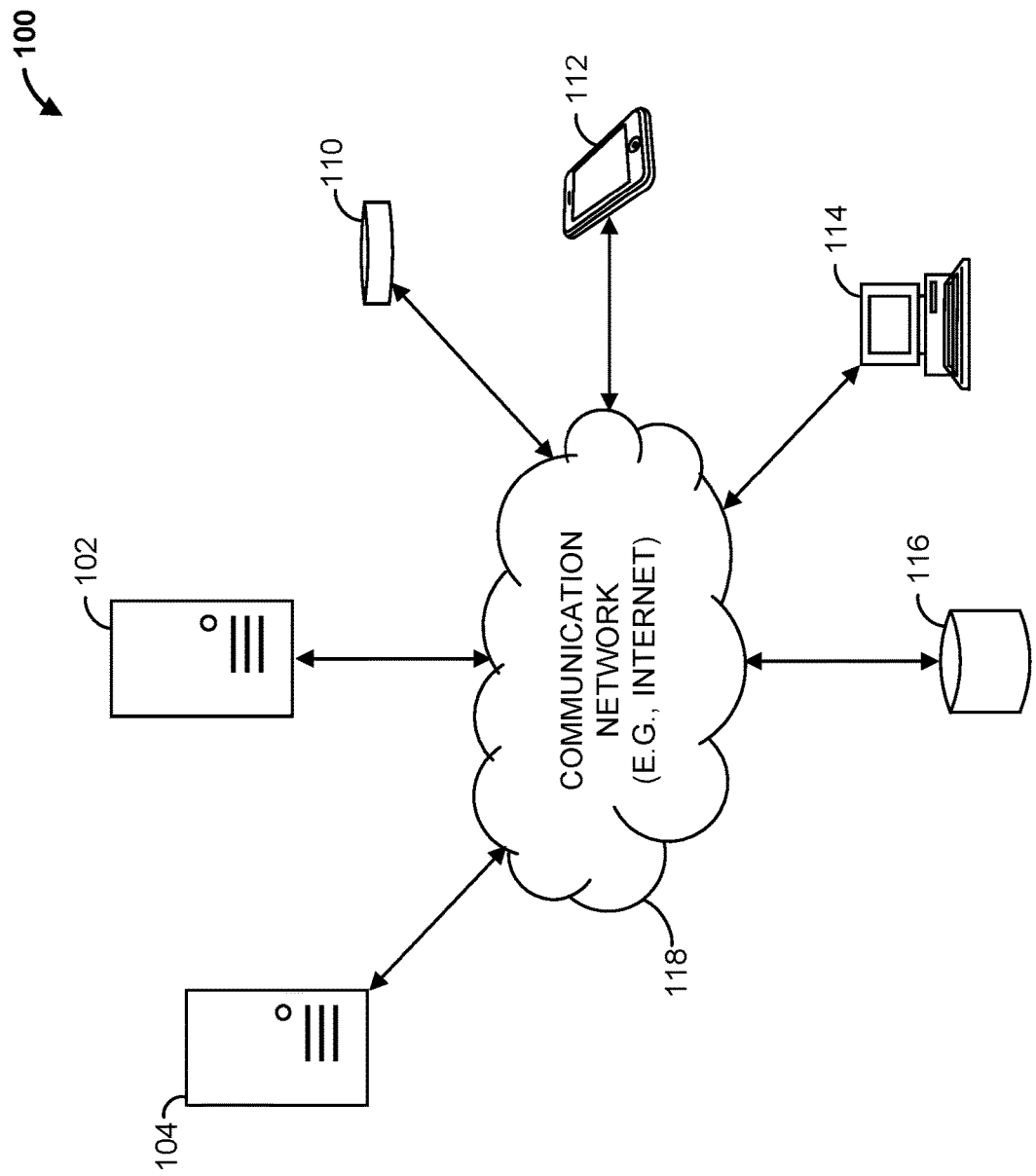
FIG. 1 is a block diagram of communication network used to personalize customer experience in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a communication system 100 that includes an in-store experience personalization computing device 102 (e.g., a server, such as an application server), a web server 104, and database 116, and multiple customer computing devices 110, 112, 114 operatively coupled over network 118.

An in-store experience personalization computing device 102, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, or through the communication network 118.

In some examples, the in-store experience personalization computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, in-store experience personalization computing device 102, and web server 104 are operated by a retailer, and multiple customer computing devices 112, 114 are operated by customers of the retailer.

Although FIG. 1 illustrates three customer computing devices 110, 112, 114, the communication system 100 used for in-store personalization can include any number of customer computing devices 110, 112, 114. Similarly, the communication system 100 can include any number of workstation(s) (not shown), in-store experience personalization computing devices 102, web servers 104, and databases 116.

The in-store experience personalization computing device 102 is operable to communicate with database 116 directly or over communication network 118. For example, in-store experience personalization computing device 102 can store data to, and read data from, database 116. Database 116 may be remote storage devices, such as a cloud-based server, a disk (e.g., a hard disk), a memory device on another application server, a networked computer, or any other suitable remote storage. Although shown remote to the in-store experience personalization computing device 102, in some examples, database 116 may be a local storage device, such as a hard drive, a non-volatile memory, or a USB stick. The in-store experience personalization computing device 102 may store data from workstations or the web server 104 in database 116. In some examples, storage devices store instructions that, when executed by in-store experience personalization computing device 102, allow intent free answering computing device 102 to determine one or more s results in response to a user query.

Communication network 118 can be a WiFi© network, a cellular network such as a 3GPP© network, a Bluetooth© network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Figure 2:
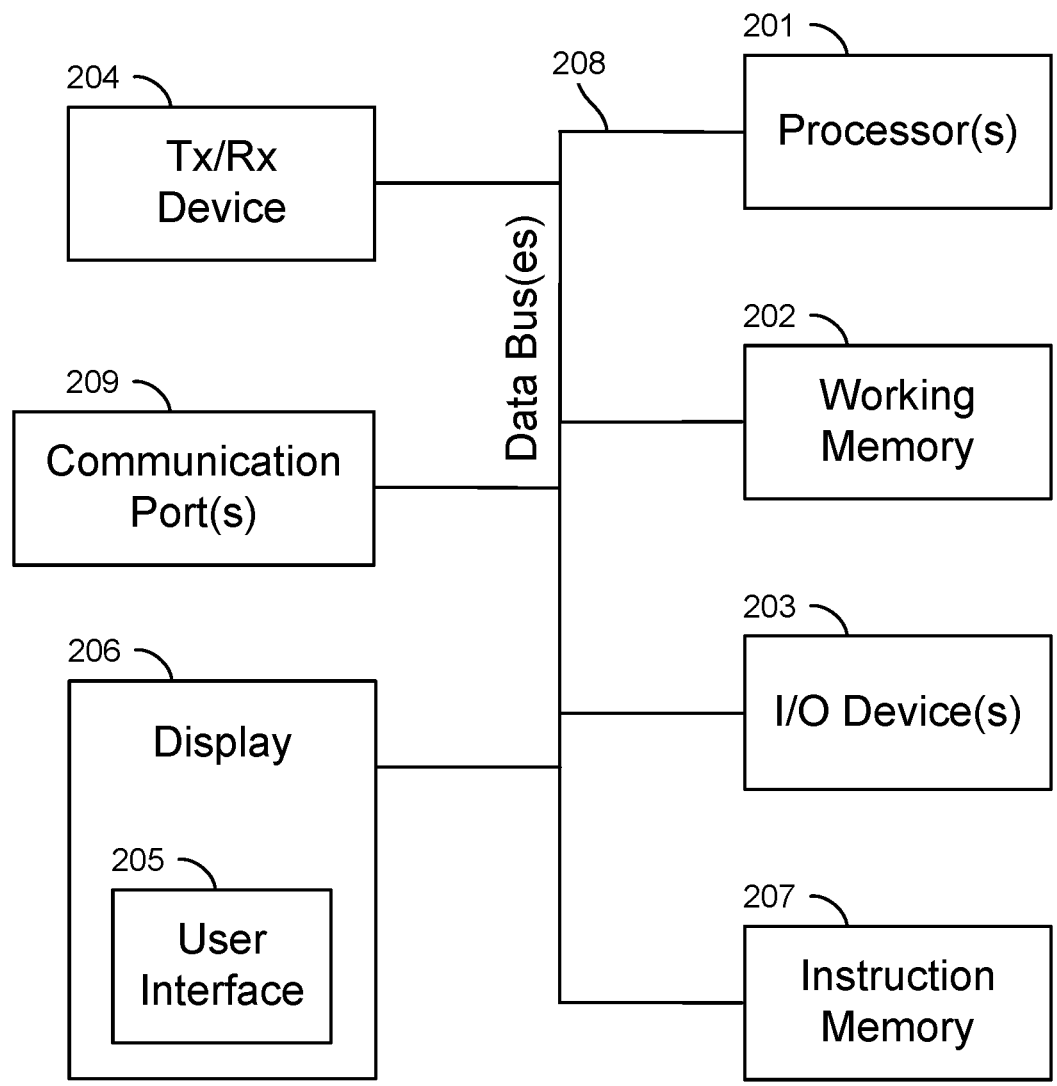
FIG. 2 is a block diagram of the in-store experience personalization computing device of the communication system of FIG. 1 in accordance with some embodiments.

FIG. 2 illustrates the in-store experience personalization computing device 102 of FIG. 1. The in-store experience personalization computing device 102 may include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of intent free answering computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with in-store experience personalization computing device 102. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 in-store experience personalization computing device 102 will be operating in. Processor(s) 201 is operable to receive data from, or send data to, a network, such as communication network 118 of FIG. 1, via transceiver 204.

Figure 3:
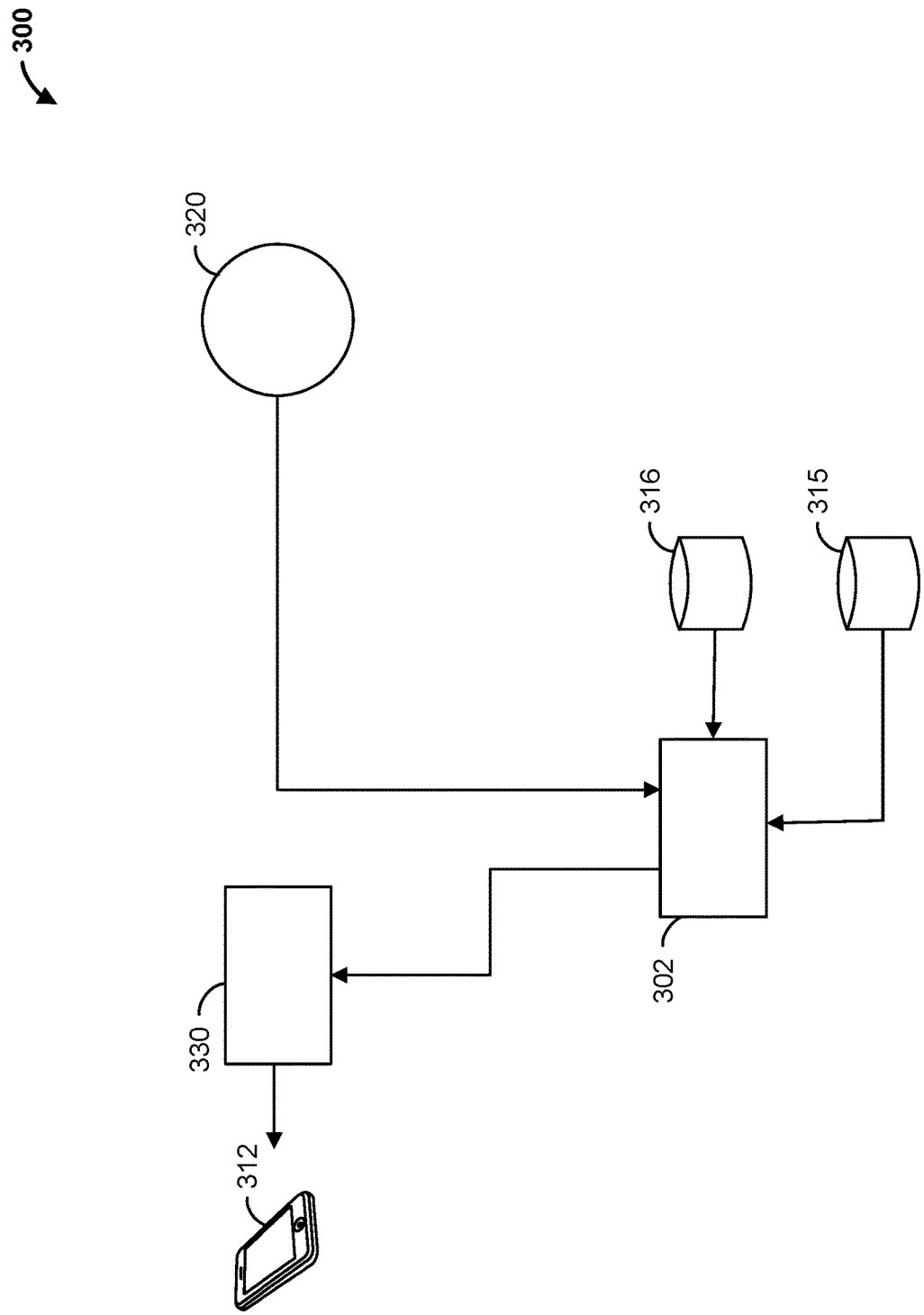
FIG. 3 is a diagram of a system for personalizing a customer's in-store experience in accordance with embodiments of the disclosed subject matter.

FIG. 3 illustrates a diagram 300 of a system for personalizing a customer's in-store experience. The in-store experience personalization computing device 302 is operably connected to data stores (databases) 315 and 316, these data stores are shown separately for illustration only to reflect different categories of data accessible by the in-store experience personalization computing device 302, however it is also envisioned that the data stores may be unitary. Data stores include real time and historical customer on-line interactions 315 and retailer information 316.

Store beacon 320 detects the presence of a customer at the retailer's physical location. The store beacons interact with customer's mobile device to determine its proximity to the retailer's physical location in order to determine the customer's presence. Location data from the customer may be determined by information provided to the beacon via a retailer app, connection to local network, or a VLR (visiting location register).

The in-store experience personalization computing device 302 is also operably connected to a notification system 330. The notification system 330 communicates through the retailer app on the user's mobile device (phone) 312, or other application, such as SMS, Social Media or other communication platform. The notification system 330 receives push notifications from the in-store experience personalization computing device 302 and relays the notifications to the customer's mobile device 312.

Figure 4:
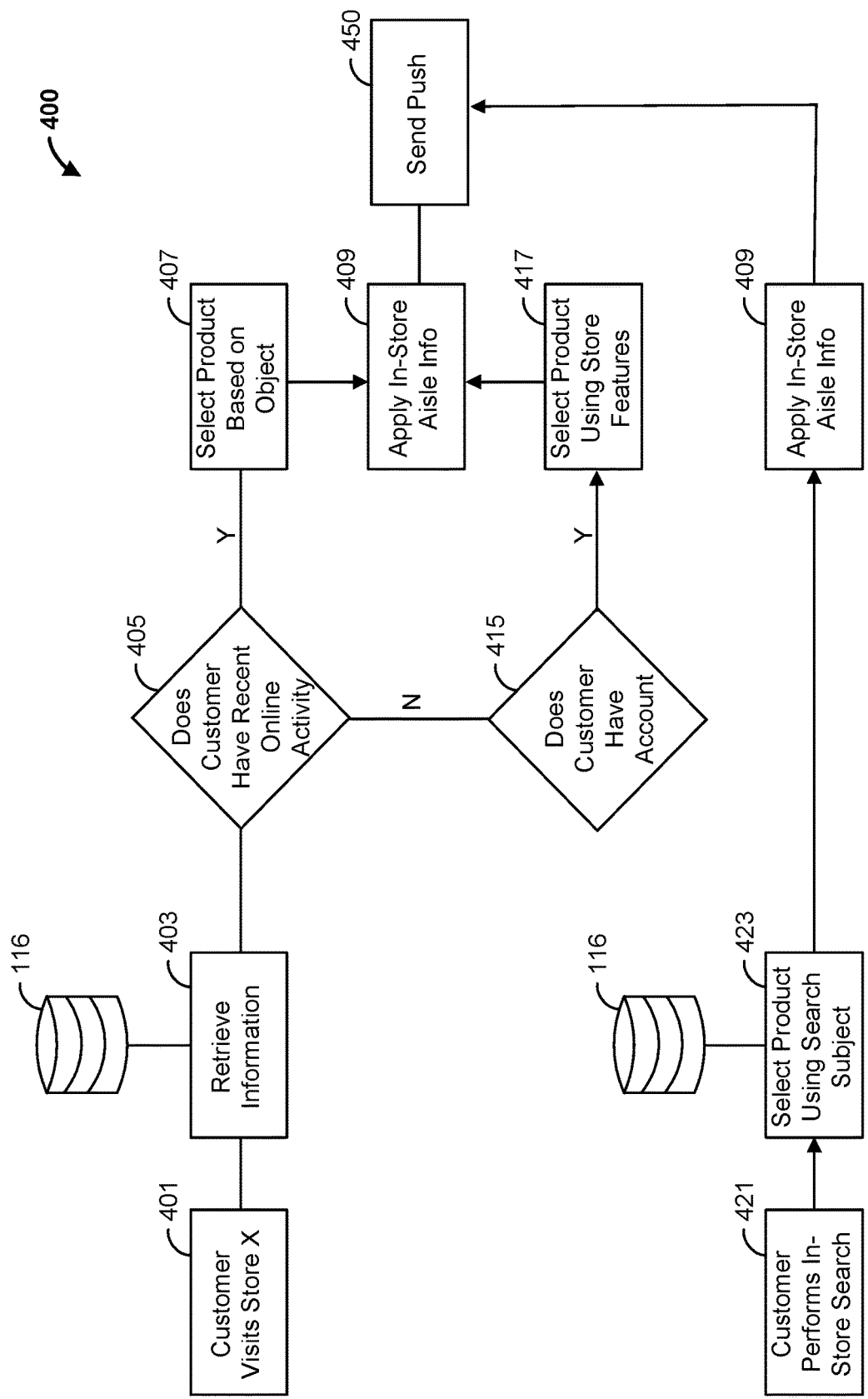
FIG. 4 is a flowchart of operations carried out by the in-store experience personalization computing device in accordance with embodiments of the disclosed subject matter: and, FIG. 5 is a flowchart of a method for personalizing customer experience at a retailer's physical location based upon classification of customer's online interaction with the retailer in accordance with embodiments of the disclosed subject matter.

The flowchart of FIG. 4 illustrates several paths for the personalization of the customer's in-store experience, each dependent upon the customer's current or prior online interactions. In one example, the customer has searched and browsed online for items related to a type of product (e.g. a bread machine) five day prior to the visit. The customer however in this example did not purchase the product. Upon visiting the retailer's physical location, specifically store X as shown in Block 401, the store location beacons are fired. Customer information and retailer information is retrieved from database 116 as shown in Block 403. The customer information is associated with the customers past session data over a predetermined time, (e.g. in the past 7 days) is fetched from the database 116. Other customer information may also be retrieved, such as customer brand affinity and price conciseness. The retailer information associated with the physical location is also retrieved from the database 116, this information may include inventory, product descriptions, product locations, store layout, local product preferences, and other features associated with store X.

As shown in decision block 405, it is determined whether the customers has recent online activity within a predetermined time period. In the present example as noted above, the customer conducted an online search for a product 5 days prior, and thus in Block 407, the system 300 selects a product(s) or type of products(s) based on the object of the recent online activity (interactions). The predetermined period may be a week, ten days, two weeks or other appropriate period and may be adjustable with respect to the date(e.g. shorter period at holidays), as well as with respect to past customer shopping patterns (e.g. visits store X once a month, and thus a 29 day period may be more advantageous) The product(s) selection may be combined with product location (aisle information for store X) as shown in Block 409 and the push notification is then sent to the customer as shown in Block 450. In the case when the customer after the search purchased a bread machine in the recent online interaction, the system advantageously may select related complimentary items for inclusion in the push notification, such as a bread slicer, or ingredients for making bread. The push notifications may take the form of a pop up, SMS, email, or phone call. The push notification may include several products (items) available at the store and ordered by relevance, along with the aisle location within the store to guide the customer.

In another example, the customer visits store Y and performs an in-store search for a product (e.g. humidifier) using the retailer's application as shown in Block 421. Receiving an API call from the application, the in-store experience personalization computing device 102, accessing the customer's interaction history and retailer information, selects product(s) as shown in Block 423 related to the subject of the in-store search, irrespective of the recent online interactions considered in the prior example. Based on the retrieved information, (e.g. customers price consciousness, popularity of specific products, store inventory, store sales etc.) the in-store experience personalization computing device 102 selects a product(s) (e.g. a popular brand of humidifier). The product(s) selection may be combined with product location (aisle information for store X) as shown in Block 409 and the push notification is then sent to the customer as shown in Block 450.

In another example, a customer visits the retailer's physical location, however the customer has not had any significant activity over the prior predetermined period, (e.g. two weeks), but has regular online activity over a second longer predetermined period (e.g. 2 years). Upon the visit to store X as shown in Block 401, the store location beacons are fired and the customer information and retailer information is retrieved from database 116 as shown in Block 403.

As shown in decision block 405, it is determined whether the customers has recent online activity within a predetermined time period. In this example as noted above, the customer has not had a recent online interaction within the predetermined period. In decision block 415 it is determined whether the customer has any online interaction over the past two years, as a result of a positive determination, products associated with features of store X are selected for the push notification as shown in Block 417. The features of store X may include items trending at that store, inventory, discounts, promotions etc. The product(s) selection may be combined with product location (aisle information for store X) as shown in Block 409 and the push notification is then sent to the customer as shown in Block 450.

Figure 5:
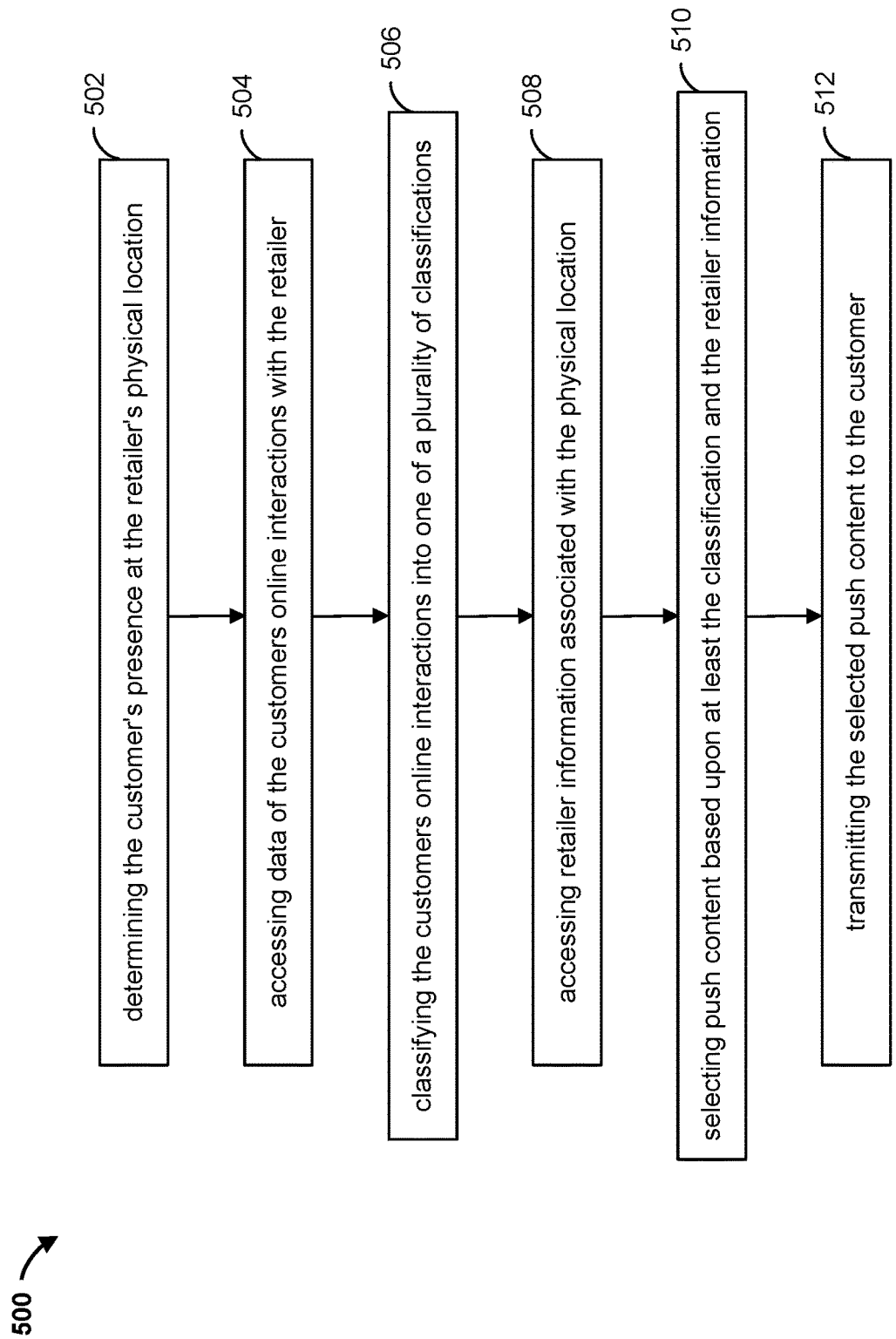

In FIG. 5, the steps involved in personalizing the in-store experience based on online interaction is illustrated. The customer's presence at one of the retailer's physical locations is detected in Block 502, preferably by the store location beacon 320. The in-store experience personalization computing device 102 receives an indication of the customer and the store visited, in response, data related to customer online interactions with the retailer is retrieved as shown in Block 504, based upon this information, the customer's online interactions are classified into one of a plurality of classifications as shown in Block 506. A first classification for online interactions within a prior first predetermined period, (e.g. within seven days, ten days, two weeks, a month), a second classification being within a prior second longer predetermined period, (e.g. within the last year or two years, or any interactions) and a third classification being a real time (i.e. during the customers visit) in-store search by the customer. Other classifications or sub classifications, based upon the type of interactions are also envisioned, such as customer clicks, views, add to cart, and/or purchases, or combinations thereof. The first classification in some embodiments results in the product (i.e. object) of the recent interactions being the basis for the products selected for the push notification, the second classification results in the features of the specific store being the basis for the products selected for the push notification and the third classification results in the object of the in-store search being the basis.

The in-store experience personalization computing device 102 also accesses retailer information associated with the particular store (physical location) visited in Block 508, as noted this information may include items trending at that store, inventory, out of stock items, discounts, promotions, product information, product location and local preferences, among others. The retailer information may be stored centrally for a plurality of stores or may be resident in each individual store. Based upon both the classification of the user's prior interactions and the retailer information particular to the visited store, products and/or services available at the retailer's physical location are selected as shown in Block 510. The selections may be ranked by relevance using additional customer historic information, as well as the retailer information, and may be combined with product location (aisle information) and transmitted to the customer's mobile device 312 as a push notification as shown in Block 512. The push notification advantageously enables the retailer at least in some situations to provide the customer with recommendations strongly related to their prior or current online interactions along with aisle navigation information directing the customer to the products relevant while they are actually in the store. The push notifications generated using the disclosed subject matter also allows for consideration of the customer's historic tendencies (brand infinity, price tolerance, etc.) to be utilized in marketing the customer while present in the store, irrespective of the customer's intent for visiting the retailer's physical location.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

While the disclosed subject matter is described using customer data obtained from online interactions with the retailer associated with the visited store, it is also envisioned that customer data from other sources, for instance interactions on search engines, or with other retailer sites would also be useful in practicing the personalization of the customer's in-store experience. For example, if the customer visiting the retailer's store, had searched in the prior five days on a generic search engine for a bread machine, or had visited a webpage for bread machines from manufacturer or other seller and that data was available to the retailer, the data could be used in the same manner as the described internal data.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system for personalizing interactions at a physical location based upon classification of prior online interactions, comprising:
   a database;
   a communication system;
   a memory having instructions stored thereon; and
   a processor configured to read the instructions to:
   determine when a mobile device is in proximity of a physical location;
   access the database for data representative of online interactions associated with the mobile device;
   classify the online interactions into one of a plurality of classifications;
   access the database for data representative of retailer information associated with the physical location;
   select push content based upon the classification of the data representative of online interactions and the data representative of the retailer information; and
   transmit, via the communication system, the selected push content to the mobile device while the mobile device is in proximity of the physical location.

2. The system of claim 1, wherein classification of the online interactions into one of the plurality of classifications is based on determination of whether an online interaction associated with the mobile device occurred within a predetermined amount of time prior to the mobile device being in proximity of the physical location.

3. The system of claim 2, wherein the predetermined amount of time is selected from the group consisting of less than or equal to a week, less than or equal to ten days, and less than or equal to a month.

4. The system of claim 2, wherein the online interactions are selected from the group consisting of search, add to cart, purchase and views.

5. The system of claim 1, wherein classification of the online interactions into one of the plurality of classifications is based on a determination of whether the mobile device generated an in-store search for a product.

6. The system of claim 1, wherein classification of the online interactions into one of the plurality of classifications is based on a determination of whether the mobile device is logged into an online account associated with the retailer information.

7. The system of claim 1, wherein the retailer information is selected from the group consisting of current inventory, product information, inventory layout, promotions, local preferences and sales trends associated with the physical location.

8. The system of claim 1, wherein the processor is further configured to select the push content based on an object of the online interactions for a first classification, wherein the push content includes the object of the online interactions.

9. The system of claim 1, wherein the processor is further configured to select the push content based on an object of the online interactions, wherein the push content includes a product complimentary to the object of the online interactions.

10. A computer-implemented method for personalizing interactions at a physical location based upon classification of prior online interactions, comprising:
    determining when a mobile device is in proximity of a physical location;
    obtaining data representative of online interactions associated with the mobile device;
    classifying the online interactions into one of a plurality of classifications;
    obtaining data representative of retailer information associated with the physical location;
    selecting push content based upon the classification of the data representative of online interactions and the data representative of the retailer information; and
    transmitting, via a communication system, the selected push content to the mobile device while the mobile device is in proximity of the physical location.

11. The computer-implemented method of claim 10, wherein classification of the online interactions into one of the plurality of classifications is based on determination of whether an online interaction associated with the mobile device occurred within a predetermined amount of time prior to the mobile device being in proximity of the physical location.

12. The computer-implemented method of claim 11, wherein the predetermined amount of time is selected from the group consisting of less than or equal to a week, less than or equal to ten days, and less than or equal to a month.

13. The computer-implemented method of claim 11, wherein the online interactions are selected from the group consisting of search, add to cart, purchase and views.

14. The computer-implemented method of claim 10, wherein classification of the online interactions into one of the plurality of classifications is based on a determination of whether the mobile device generated an in-store search for a product.

15. The computer-implemented method of claim 10, wherein classification of the online interactions into one of the plurality of classifications is based on a determination of whether the mobile device is logged into an online account associated with the retailer information.

16. The computer-implemented method of claim 10, wherein the retailer information is selected from the group consisting of current inventory, product information, inventory layout, promotions, local preferences and sales trends associated with the physical location.

17. The computer-implemented method of claim 10, wherein the push content is selected based on an object of the online interactions for a first classification, wherein the push content includes the object of the online interactions.

18. The computer-implemented method of claim 10, wherein the push content is selected based on an object of the online interactions, wherein the push content includes a product complimentary to the object of the online interactions.

19. A non-transitory computer-readable medium having instructions stored thereon, wherein the instructions, when executed by at least one processor, cause a device to perform operations comprising:
    determining when a mobile device is in proximity of a physical location;
    accessing a database for data representative of online interactions associated with the mobile device;
    classifying the online interactions into one of a plurality of classifications;
    accessing the database for data representative of retailer information associated with the physical location;
    selecting push content based upon the classification of the data representative of online interactions and the data representative of the retailer information; and
    transmitting, via a communication system, the selected push content to the mobile device while the mobile device is in proximity of the physical location.

20. The non-transitory computer-readable medium of claim 19, wherein classification of the online interactions into one of the plurality of classifications is based on determination of whether an online interaction associated with the mobile device occurred within a predetermined amount of time prior to the mobile device being in proximity of the physical location, wherein the online interactions are selected from the group consisting of search, add to cart, purchase and views, and wherein the predetermined amount of time is selected from the group consisting of less than or equal to a week, less than or equal to ten days, and less than or equal to a month.

* * * * *